US008632265B2

(12) United States Patent
Naito

(10) Patent No.: US 8,632,265 B2
(45) Date of Patent: Jan. 21, 2014

(54) SHUTTER DEVICE CAPABLE OF PREVENTING FOREIGN MATTER FROM ADHERING TO MAGNETIC STICKING SURFACE AND CAMERA INCLUDING SHUTTER DEVICE

(75) Inventor: Dai Naito, Kawasaki (JP)

(73) Assignee: Canon Kabushiki Kaisha (JP)

( * ) Notice: Subject to any disclaimer, the term of this patent is extended or adjusted under 35 U.S.C. 154(b) by 104 days.

(21) Appl. No.: 13/331,519

(22) Filed: Dec. 20, 2011

(65) Prior Publication Data
US 2012/0155850 A1 Jun. 21, 2012

(30) Foreign Application Priority Data
Dec. 20, 2010 (JP) ................................. 2010-283240

(51) Int. Cl.
G03B 9/08 (2006.01)
(52) U.S. Cl.
USPC ........................................................ 396/465
(58) Field of Classification Search
USPC .......................................... 396/463, 465–468
See application file for complete search history.

(56) References Cited

U.S. PATENT DOCUMENTS

| 4,313,658 | A | * | 2/1982 | Sugiura et al. | 396/357 |
| 4,487,492 | A | * | 12/1984 | Toyoda et al. | 396/466 |
| 2011/0103787 | A1 | * | 5/2011 | Niwamae | 396/463 |
| 2012/0128343 | A1 | * | 5/2012 | Niwamae | 396/357 |
| 2012/0128345 | A1 | * | 5/2012 | Nishio et al. | 396/493 |
| 2012/0128346 | A1 | * | 5/2012 | Matsumoto | 396/493 |
| 2012/0141106 | A1 | * | 6/2012 | Inukai | 396/358 |
| 2012/0141107 | A1 | * | 6/2012 | Inukai | 396/358 |
| 2012/0155850 | A1 | * | 6/2012 | Naito | 396/463 |

FOREIGN PATENT DOCUMENTS

| JP | 09-179164 A | 7/1997 |
| JP | 2005-227359 A | 8/2005 |

* cited by examiner

*Primary Examiner* — WB Perkey
(74) *Attorney, Agent, or Firm* — Rossi, Kimms & McDowell LLP

(57) ABSTRACT

A shutter device capable of preventing foreign matter from adhering to an attracting surface of an armature to a yoke, without providing an additional member. In a state of the shutter device assembled to a camera body, an attracting surface of the armature, provided on a drive lever, to the yoke that magnetically attracts the armature extends perpendicularly to a bottom surface of the camera body and is disposed closer to the bottom of the camera body than is a pivotal axis of the drive lever. The shutter device releases the armature of the drive lever from a state attracted and held by the yoke to thereby allow the drive lever to pivot by the urging force of a drive spring, whereby said shutter blade is driven in the direction of closing an opening formed in a base plate.

8 Claims, 7 Drawing Sheets

SHUTTER DEVICE CAPABLE OF PREVENTING FOREIGN MATTER FROM ADHERING TO MAGNETIC STICKING SURFACE AND CAMERA INCLUDING SHUTTER DEVICE

BACKGROUND OF THE INVENTION

1. Field of the Invention

The present invention relates to a shutter device mounted to an image pickup apparatus, such as a digital camera, and a camera including the shutter device, and more particularly to a shutter device having a yoke which magnetically attracts an armature thereto, and a camera including the shutter device.

2. Description of the Related Art

Shutter devices mounted to image pickup apparatuses, such as a digital camera, include one having a front blade which travels to a position for opening a shutter opening at the time of exposure, and a rear blade which travels to a position for closing the shutter opening at the time of exposure.

The front blade is connected to a drive unit having a drive source, such as a spring, and an armature for being attracted to and held at a control magnet. In a shooting preparation state, a charge lever brings the armature of the drive unit into contact with a yoke attracting surface of the control magnet, whereby the front blade is held in a position for closing the shutter opening. Further, the rear blade is also connected to a drive unit similar to the drive unit connected to the front blade. In the shooting preparation state, a charge lever brings an armature of the drive unit into contact with a yoke attracting surface of a control magnet, whereby the rear blade is held in a position for opening the shutter opening.

Then, in shooting, the charge levers retract from respective positions for holding the front and rear blades, and the front and rear blades are held at respective traveling start positions by respective magnetic forces of the energized control magnets. Thereafter, starting with the front blade, the control magnet associated therewith is deenergized, whereby the front blade travels to the position for opening the shutter opening. A predetermined time period later, the control magnet associated with the rear blade is deenergized, whereby the rear blade travels to the position for closing the shutter opening. Thus an exposure operation is performed. After completion of traveling of the front and rear blades, the front and rear blades are moved by the associated charge levers to the respective shooting preparation positions and wait for the next shooting.

Further, single-lens reflex type digital cameras include one which performs an image pickup operation by a shutter device using a focal plane shutter and an electronic shutter in combination. In this shutter device, a rear curtain is formed by a mechanical shutter, and the electronic shutter performs resetting scanning of pixels of an image pickup device before the rear curtain travels. Electric charge accumulation start scanning by the image pickup device has a scanning pattern adapted to the traveling characteristics of the mechanical shutter as the rear curtain.

By the way, in a shutter device which controls exposure time by changing timing in which the control magnet is deenergized, if foreign matter, such as dust, water drops, or oil, adheres to the attracting surface of the armature to the yoke of the control magnet, this causes a deviation in traveling timing of the blades, which prevents normal exposure time from being obtained.

To cope with this, in order to take off foreign matter from the attracting surface of the armature to the yoke of the control magnet during or after assembling the shutter device, the attracting surface is exposed outside. Further, there has been disclosed a technique in which to prevent foreign matter from entering the attracting surface, before the shutter device is assembled to a camera, a recess is formed in a shutter base plate, for fitting a drive lever therein, and the shutter device is assembled to the camera in a state in which the yoke and the armature are attracted to the shutter base plate (see Japanese Patent Laid-Open Publication No. H09-179164).

However, the above-described conventional technique has a problem that foreign matter, such as sliding dust, or oil, enters the shutter device from movable portions of a mirror, gears, etc. after the shutter device has been assembled to the camera, and adheres to the attracting surface of the armature to the yoke.

To prevent this problem, there has been disclosed a construction that prevents foreign matter from entering the shutter device by covering the surrounding of a shutter plate, a cover plate, and a drive magnetic pole portion with a shield member (see Japanese Patent Laid-Open Publication No. 2005-227359).

However, in the conventional technique disclosed in Japanese Patent Laid-Open Publication No. 2005-227359, it is necessary to additionally provide a shield member for covering the whole shutter device, which increases the costs and degrades the ease of assembly of the camera.

SUMMARY OF THE INVENTION

The present invention provides a shutter device which is capable of preventing foreign matter from adhering to an attracting surface of an armature to a yoke, without providing an additional member, and a camera including the shutter device.

In a first aspect of the present invention, there is provided a shutter device that is mounted to a camera body, comprising a base plate that has an opening formed therethrough, a shutter blade configured to move between a position for closing the opening and a position for opening the opening, a drive lever configured to pivot with respect to the base plate to thereby drive the shutter blade in a direction of closing the opening, the drive lever having an armature, a drive spring configured to urge the drive lever, and a yoke configured to magnetically attract and hold the armature, wherein the shutter device releases the armature from a state attracted and held by the yoke to thereby allow the drive lever to pivot by an urging force of the drive spring, whereby the shutter blade is driven in the direction of closing the opening, wherein when the shutter device is in a state assembled to the camera body, an attracting surface of the armature to the yoke extends in a direction perpendicular to a bottom surface of the camera body and is disposed closer to the bottom of the camera body than a pivotal axis about which the drive lever pivots is, and wherein when the armature is released from the state attracted and held by the yoke, the drive lever is caused to pivot by the urging force of the drive spring toward a top of the camera body from a bottom side of the camera body.

In a second aspect of the present invention, there is provided a camera comprising the shutter device, and a camera body member having a lens mounting portion provided formed thereon to and from which a lens can be mounted and removed, wherein the camera body member has a cover plate portion formed thereon, and wherein the cover plate portion covers the cleaning opening by mounting of the shutter device to the camera body member.

In a third aspect of the present invention, there is provided a shutter device that is mounted to a camera body, comprising a base plate that has an opening formed therethrough, a shutter blade configured to move between a position for closing the opening and a position for opening the opening, a blade lever configured to pivot with respect to the base plate to thereby move the shutter blade between the position for closing the opening and the position for opening the opening, a return spring configured to urge the blade lever, a drive lever configured to pivot with respect to the base plate to thereby drive the shutter blade in a direction in which the shutter blade closes the opening, the drive lever having an armature, a drive spring configured to urge the drive lever, and a yoke configured to magnetically attract and hold the armature, wherein the shutter device releases the armature from a state attracted and held by the yoke to thereby allow the drive lever and the blade lever to pivot by an urging force of the drive spring, whereby the shutter blade is driven in the direction of closing the opening, wherein when the shutter device is in a state assembled to the camera body, an attracting surface of the armature to the yoke extends in a direction perpendicular to a bottom surface of the camera body and is disposed closer to the bottom of the camera body than a pivotal axis about which the drive lever pivots is, and wherein when the armature is released from the state attracted and held by the yoke, the drive lever is caused to pivot by the urging force of the drive spring toward a top of the camera body from a bottom side of the camera body.

In a fourth aspect of the present invention, there is provided a camera comprising the shutter device, and a camera body member having a lens mounting portion formed thereon to and from which a lens can be mounted and removed, wherein the camera body member has a cover plate portion formed thereon, and wherein the cover plate portion covers the cleaning opening by mounting of the shutter device to the camera body member.

According to the present invention, it is possible to prevent foreign matter from adhering to an attracting surface of an armature to a yoke without providing an additional member.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
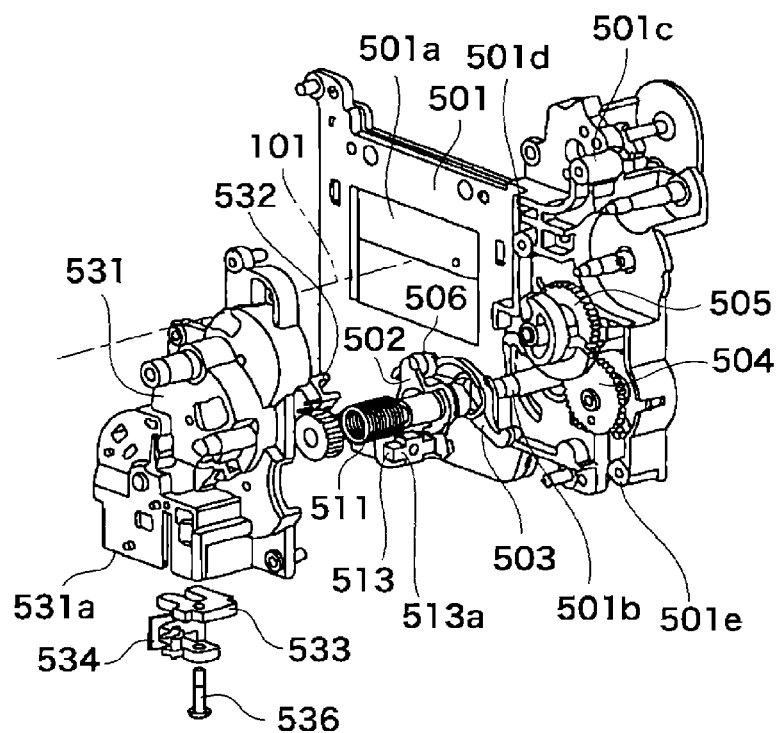
FIG. 1 is an exploded perspective view of a mechanical shutter as a shutter device according to an embodiment of the present invention.
Figure 2:
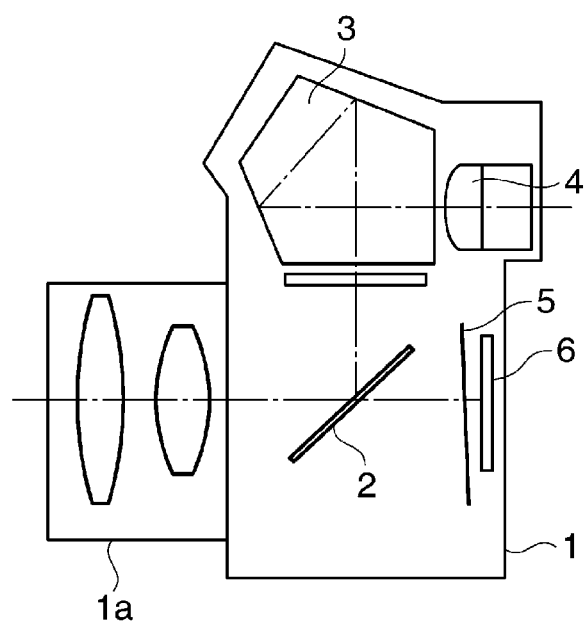
FIG. 2 is a schematic cross-sectional view of a digital single-lens reflex camera to which the mechanical shutter shown in FIG. 1 is mounted.

FIG. 1 is an exploded perspective view of a mechanical shutter as a shutter device according to an embodiment of the present invention. FIG. 2 is a schematic cross-sectional view of a digital single-lens reflex camera to which the mechanical shutter shown in FIG. 1 is mounted.

First, a description will be given of a digital single-lens reflex camera to which the mechanical shutter according to the present embodiment is mounted with reference to FIG. 2. As shown in FIG. 2, the digital single-lens reflex camera has a camera body 1 on which a lens barrel 1a is mounted in a removable manner. Further, the camera body 1 has a quick return mirror 2 provided therein in a manner capable of pivoting between a position in which the quick return mirror 2 enters a photographic light path (mirror down) and a position in which the quick return mirror 2 retracts from the photographic light path (mirror up).

When the quick return mirror 2 is in the mirror down state, light flux of an object incident through the lens barrel 1a is reflected by the quick return mirror 2, and is then guided to an eyepiece 4 through a pentaprism 3. On the other hand, when the quick return mirror 2 is in the mirror up state, light flux of an object incident through the lens barrel 1a is guided to an image pickup device 6 through a mechanical shutter 5.

The image pickup device 6 has an electronic fore curtain shutter function which performs a slit exposure operation in synchronism with the mechanical shutter 5. Electric charge accumulated in the image pickup device 6 is discharged before shooting to thereby perform resetting scanning of pixels, and the camera enters a shooting standby state. Then, a shutter blade group of the mechanical shutter 5 is opened to thereby bring the image pickup device 6 into an exposed state, whereafter a slit exposure operation is performed in the same direction as a traveling direction of the shutter blade group. After the slit exposure operation, the shutter blades of the shutter blade group of the mechanical shutter 5 travel, whereby it is made possible to expose all pixels of the image pickup device 6 for the same time period.

Next, a description will be given of the mechanical shutter 5 as the shutter device according to the embodiment of the present invention.

As shown in FIG. 1, the mechanical shutter 5 as the shutter device according to the present embodiment has a base plate 501 formed with an opening 501a. Further, the base plate 501 has a shaft 501b provided therein in a manner extending therefrom, and the shaft 501b is disposed at a location closer to a bottom side of the camera body 1 than a photographic optical axis 101 is. A blade drive lever 502 and a blade lever 503 are coaxially supported by the shaft 501b in a pivotable manner. The blade drive lever 502 is urged by a drive spring 511 for clockwise pivotal movement about the shaft 501b, as viewed in FIG. 1.

Further, the base plate 501 has shafts 501c, 501d, and 501e erected thereon, and a shutter cover 531 is fitted on the shafts 501c, 501d, and 501e. A photo sensor 532 for detecting a rotational phase of the blade lever 503 is mounted on the shutter cover 531. Further, a yoke 533 and a coil 534 are fixed to the shutter cover 531 with a screw 536.

Figure 3:
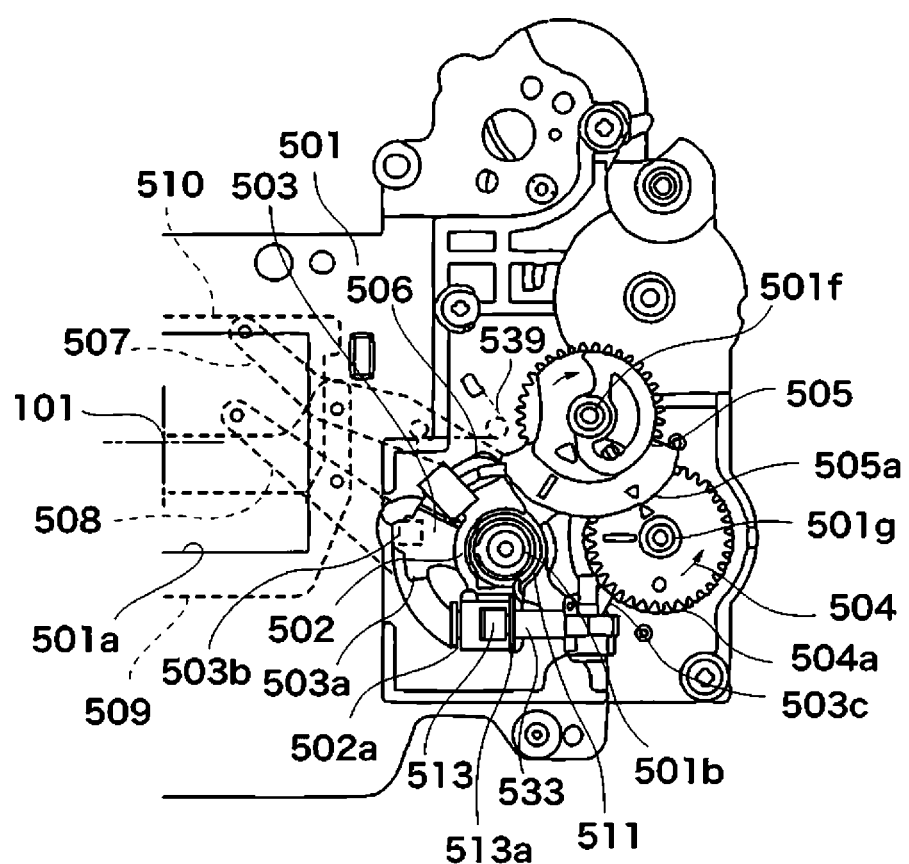
FIG. 3 is an elevational view of essential parts of the mechanical shutter in a shooting standby state.

FIG. 3 is an elevational view of essential parts of the mechanical shutter 5 in the shooting standby state. As shown in FIG. 3, the blade drive lever 502 is provided with a drive surface 502a. When the blade drive lever 502 is driven by an urging force of the drive spring 511, the drive surface 502a is brought into collision with a driven surface 503a of the blade lever 503, whereby the blade drive lever 502 and the blade lever 503 are driven in unison. Further, a roller 506 is rotatably mounted on the blade drive lever 502.

The blade lever 503 is provided with a blade drive pin 503b which protrudes therefrom, and torque is transmitted to blade arms 507 and 508 provided on the base plate 501 via the blade drive pin 503b.

The blade arms 507 and 508, and shutter blade groups 509 and 510 form a well-known parallel link, and the pivotal movement of the blade lever 503 causes the shutter blade groups 509 and 510 to be moved. Further, the blade arm 507 is urged by a return spring 539 in a counterclockwise direction about the shaft 501b, as viewed in FIG. 3.

A first cam gear 505 is rotatably supported on a shaft 501f erected on the base plate 501, and is rotated clockwise, as viewed in FIG. 3, by energizing a motor, not shown. In the state shown in FIG. 3, the roller 506 provided on the blade drive lever 502 is engaged with a cam top of a cam surface 505a of the first cam gear 505. BY this arrangement, the clockwise urging force, as viewed in FIG. 3, of the blade drive lever 502 by the drive spring 511 is received by the cam surface 505a of the first cam gear 505 via the roller 506, so that the blade drive lever 502 is stopped in a position shown in FIG. 3 in a charged condition.

A second cam gear 504 is rotatably supported on a shaft 501g erected on the base plate 501, and is rotated counterclockwise, as viewed in FIG. 3, by energizing the motor, not shown. Further, the second cam gear 504 is formed with a cam surface 504a which is brought into abutment with a cam follower 503c of the blade lever 503. In the state shown in FIG. 3, although the counterclockwise force, as viewed in FIG. 3, by the return spring 539 acts on the blade lever 503, the cam surface 504a is brought into abutment with the cam follower 503c, which stops the blade lever 503 in a position shown in FIG. 3.

An armature 513 is provided on the blade drive lever 502, and is brought into contact with the yoke 533 fixed to the shutter cover 531 in its state illustrated in FIG. 3. Further, when the coil 534 is in an energized state, the yoke 533 is magnetized, and magnetically attracts and holds the armature 513.

Figure 7:
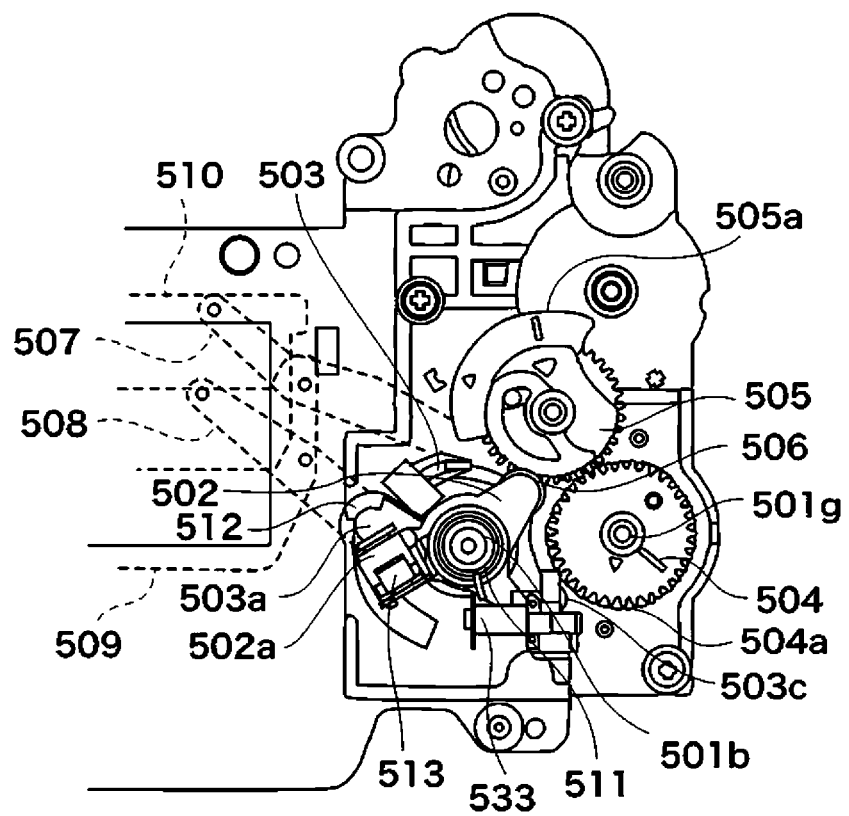
FIG. 7 is a view showing a state in which traveling of shutter blade groups has been completed.

Further, when the coil 534 is deenergized in a state in which the roller 506 on the blade drive lever 502 is removed from the cam surface 505a, the armature 513 is released from a state attracted to the yoke 533 and is pivoted clockwise, as viewed in FIG. 3, by the urging force of the drive spring 511, together with the blade drive lever 502. At this time, the blade lever 503 is also driven in the same direction, to thereby cause the shutter blade groups 509 and 510 to travel in a direction from bottom to top of the camera body 1 and close the opening 501a (see FIG. 7).

An attracting surface 513a of the armature 513 to the yoke 533 is disposed such that it extends along a direction substantially perpendicular to the bottom surface of the camera body 1, and is closer to the bottom of the camera body 1 than the axis of the shaft 501b (pivotal axis of the blade drive lever 502 and the blade lever 503 pivot) erected on the base plate 501. Therefore, when the armature 513 is released from the state attracted and held by the yoke 533 to rotate clockwise together with the blade drive lever 502, as viewed in FIG. 3, the attracting surface 513a is never oriented toward the top of the camera body 1.

Next, a description will be given of an example of the operation of the mechanical shutter 5.

If a release button, not shown, provided on the camera body 1 is pressed when the mechanical shutter 5 is in the state illustrated in FIG. 3, the quick return mirror 2 is subjected to a mirror-up operation, and the coil 534 is energized to magnetize the yoke 533, whereby the yoke 533 attracts and holds the armature 513. Then, by energizing the motor, not shown, the first cam gear 505 is rotated clockwise and at the same time the second cam gear 504 is rotated counterclockwise, whereby the mechanical shutter 5 is brought to a state shown in FIG. 4.

Figure 4:
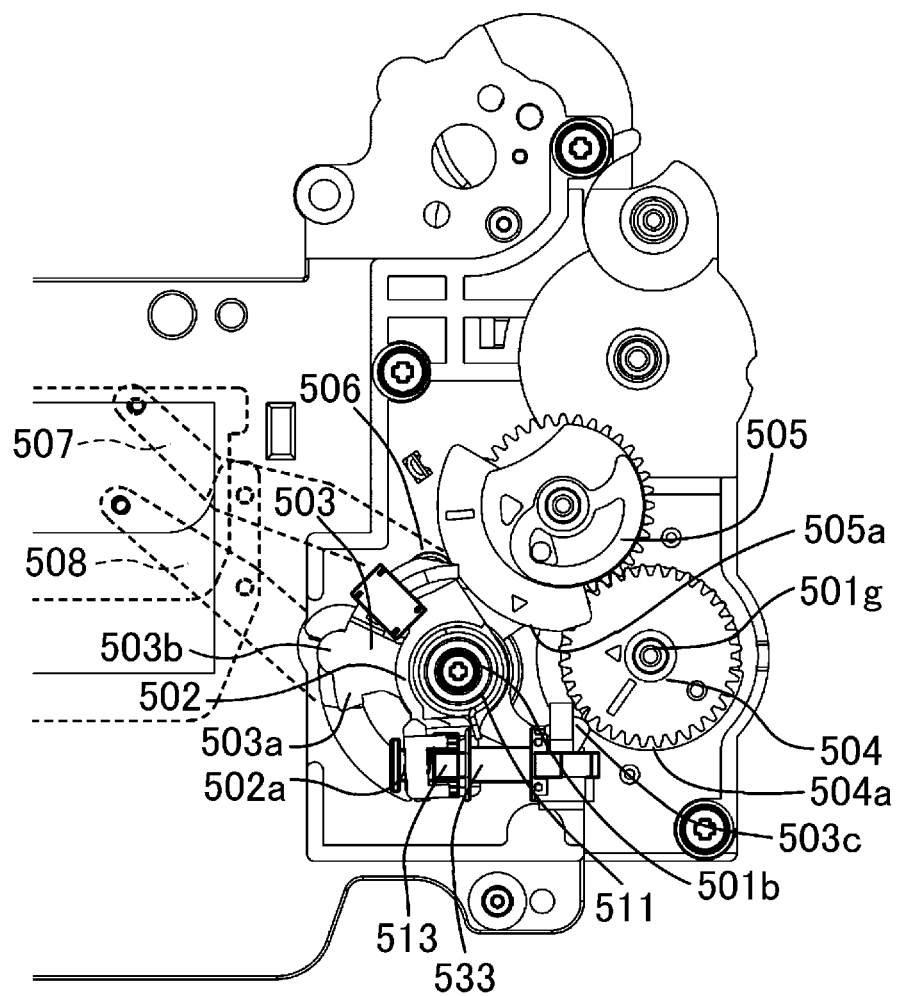
FIG. 4 is a view showing a moment when a cam follower of a blade lever is removed from a cam surface of a second cam gear.

FIG. 4 is a view showing a moment when the contact between the cam surface 504a of the second cam gear 504 and the cam follower 503c of the blade lever 503 is released.

In the state shown in FIG. 4, when the contact between the cam surface 504a of the second cam gear 504 and the cam follower 503c of the blade lever 503 is released, the blade arm 507 is pivoted counterclockwise about the shaft 501b by the urging force of the return spring 539. This causes the shutter blade groups 509 and 510 to pivot in a direction of opening the opening 501a, whereby the mechanical shutter 5 is brought to a state shown in FIG. 5.

Figure 5:
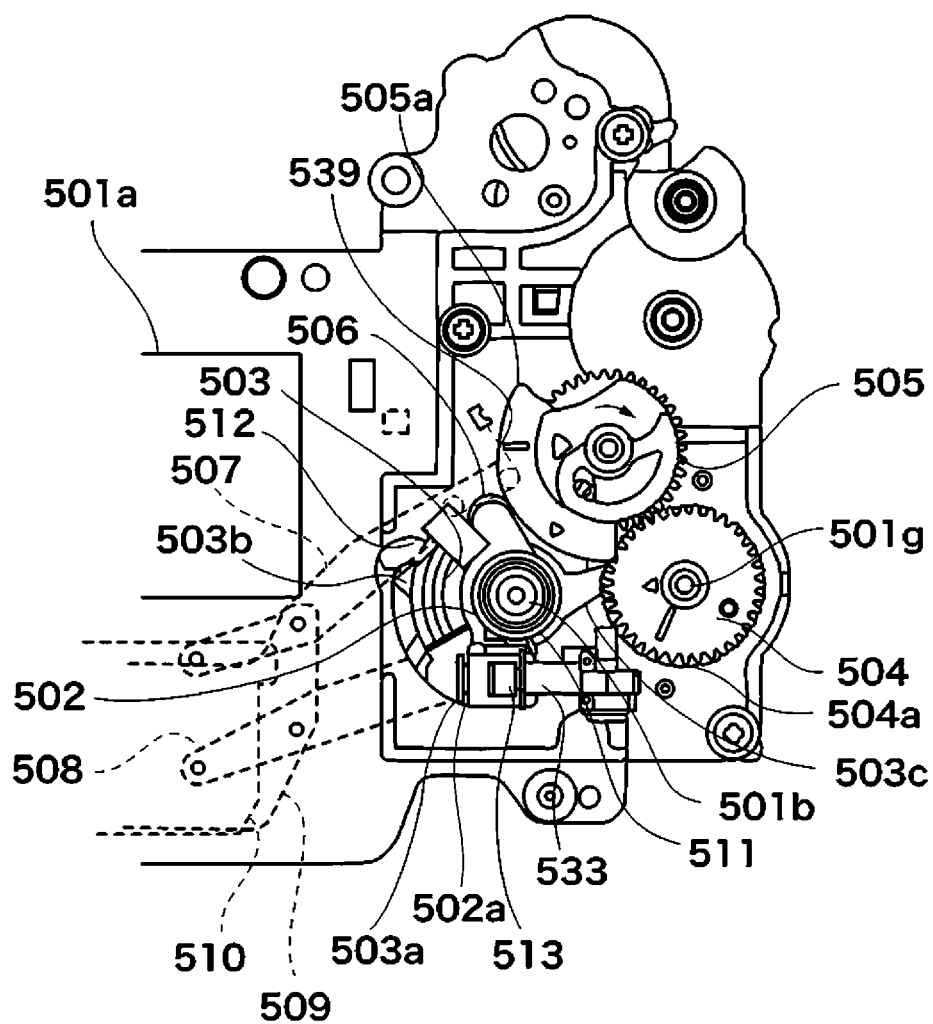
FIG. 5 is a view showing a state in which a driven surface of the blade lever is brought into abutment with a driving surface of a blade drive lever and is stopped.

When the mechanical shutter 5 is in the state shown in FIG. 5, the blade lever 503 has its driven surface 503a brought into abutment with the drive surface 502a of the blade drive lever 502, and is stopped. At this time, the roller 506 attached to the blade drive lever 502 is in a state positioned on the cam surface 505a of the first cam gear 505, and therefore, the blade drive lever 502 is in a state prevented from pivoting clockwise.

Figure 6:
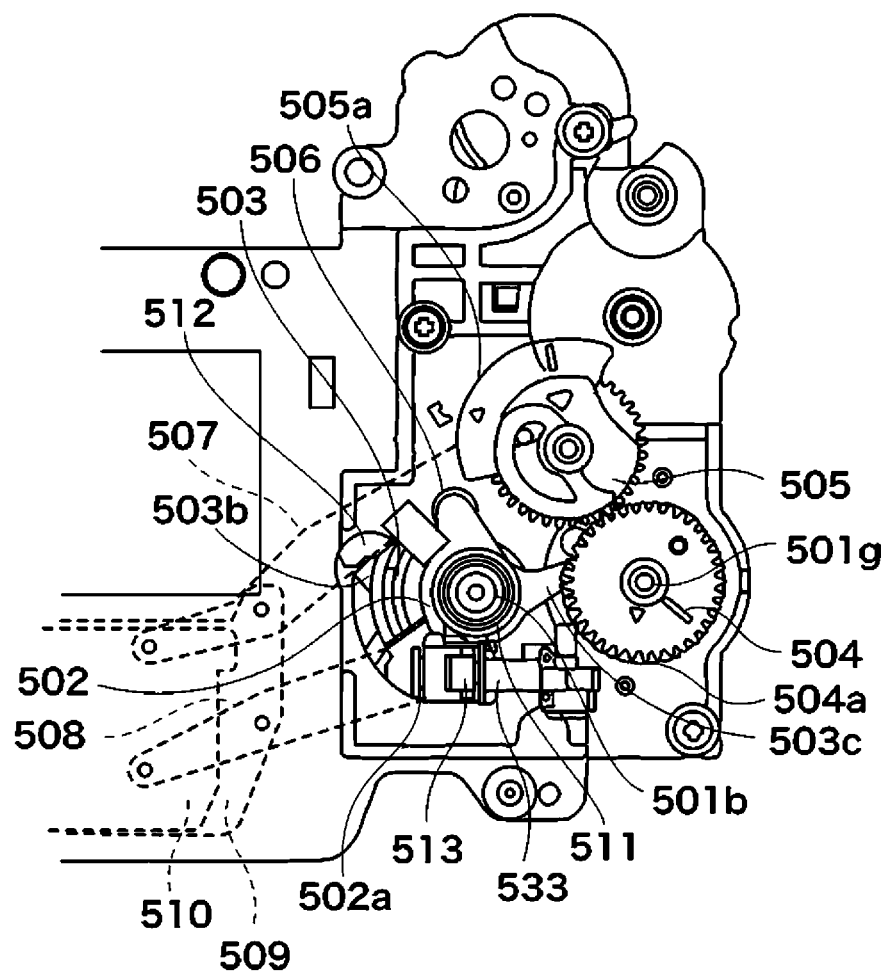
FIG. 6 is a view showing a state in which a roller mounted on the blade drive lever is removed from a cam surface of a first cam gear.

When the first cam gear 505 rotates clockwise from the state illustrated in FIG. 5, this brings the mechanical shutter 5 to a state shown in FIG. 6. In the state shown FIG. 6, although the roller 506 attached to the blade drive lever 502 is removed from the cam surface 505a of the first cam gear 505, the armature 513 is attracted and held by the yoke 533, which prevents the blade drive lever 502 from pivoting.

Next, the image pickup device 6 performs resetting scanning, and discharges accumulated electric charge to thereby set the camera to the shooting standby state. Then, the slit exposure operation is performed sequentially toward the top of the camera body 1 from the bottom side of the same. Then, when a time corresponding to a shutter speed set by the user on a console section, not shown, provided on the camera body 1, the coil 534 is deenergized.

The deenergization of the coil 534 releases the armature 513 from the state attracted and held by the yoke 533. This causes the blade drive lever 502 to pivot clockwise toward the top of the camera body 1 from the bottom side of the same in unison with the blade lever 503 by the urging force of the drive spring 511 via the drive surface 502a and the driven surface 503a, whereby the shutter blade groups 509 and 510 are caused to travel in a direction of closing the opening 501a, and the blade lever 503 is stopped by a shock-absorbing rubber 512 as a stopper, thereby completing the traveling of the shutter blade groups 509 and 510. This brings the mechanical shutter 5 to a state shown in FIG. 7.

Next, the first cam gear 505 rotates clockwise, causing the cam surface 505a to push the roller 506 against the urging force of the drive spring 511, whereby the blade drive lever 502 is charged and the mechanical shutter 5 returns to the state shown in FIG. 3. During this charging operation, the cam follower 503c of the blade lever 503 is contact with the cam surface 504a of the second cam gear 504, and hence it is possible to maintain a state in which the opening 501a is covered by the shutter blade groups 509 and 510. This makes it possible to prevent the image pickup device 6 from being exposed during reading of electric charge, thereby making it possible to prevent occurrence of a smear.

Figure 8:
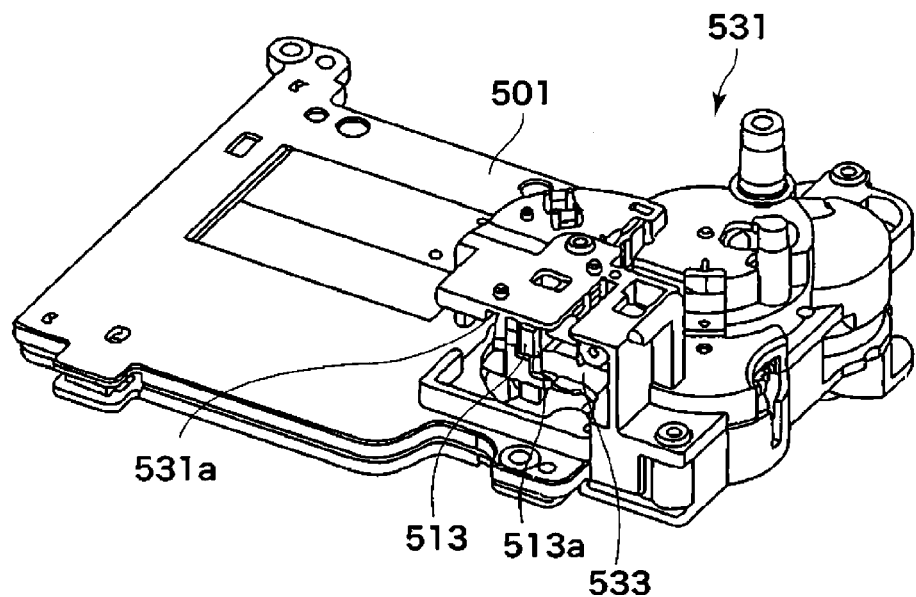
FIG. 8 is a perspective view of the mechanical shutter as taken from the bottom of a camera body.

Next, a description will be given of a method of eliminating foreign matter adhering to the attracting surface 513a of the armature 513 to the yoke 533 after the mechanical shutter 5 has been assembled, with reference to FIG. 8. FIG. 8 is a perspective view of the mechanical shutter 5 as taken from the bottom of the camera body 1.

As shown in FIG. 8, the mechanical shutter 5 has a cleaning opening 531a between the base plate 501 and the shutter cover 531, which is exposed toward the bottom of the camera body 1. Foreign matter adhering to the attracting surface 513a of the armature 513 to the yoke 533 is eliminated from the cleaning opening 531a during or after assembling the mechanical shutter 5.

Figure 9:
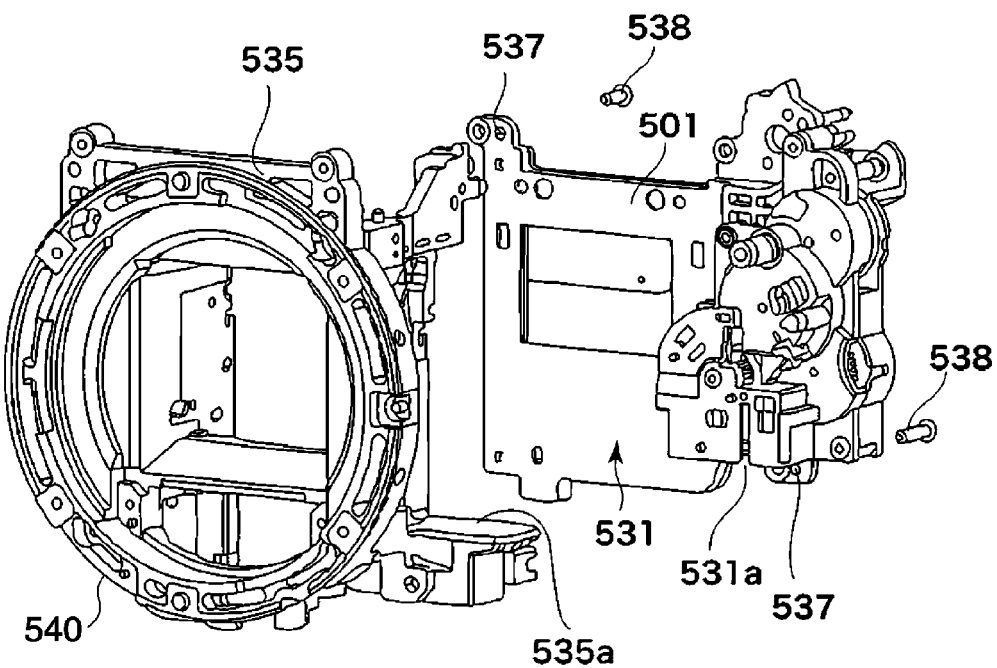
FIG. 9 is a perspective view showing a state before fixing the mechanical shutter to a mirror box.

Next, a description will be given of a method of fixing the mechanical shutter 5 to a mirror box 535 with reference to FIG. 9. FIG. 9 is a perspective view showing a state before fixing the mechanical shutter 5 to the mirror box 535. The mirror box 535 supports the quick return mirror 2 in a pivotable manner. The mirror box 535 has a lens mount 540 to and from which the lens barrel 1a can be mounted and removed.

As shown in FIG. 9, the mirror box 535 has a cover plate portion 535a provided as a part thereof which extends substantially parallel to the bottom surface of the camera body 1. The mechanical shutter 5 is mounted on the mirror box 535 from a rear side of the camera body 1. In doing this, the mounting position is determined by having a pin, not shown, of the mirror box fitted in a hole 537 formed in the base plate 501.

Then, after positioning the mechanical shutter 5, when the mechanical shutter 5 is mounted on the mirror box 535 with a screw 538, the cleaning opening 531a between the base plate 501 and the shutter cover 531 is covered by the cover plate portion 535a of the mirror box 535. This makes it possible to prevent foreign matter from entering the attracting surface 513a of the armature 513 to the yoke 533 from the bottom side of the camera body 1 after assembly of the mechanical shutter 5 to the camera body 1.

As described above, in the present embodiment, after the mechanical shutter 5 has been assembled to the camera body 1, the cleaning opening 531a is covered by the cover plate portion 535a, which makes it possible to prevent foreign matter from entering the attracting surface 513a from the bottom side of the camera body 1.

Further, in the present embodiment, when the armature 513 is released from the state attracted and held by the yoke 533 to rotate clockwise together with the blade drive lever 502, the attracting surface 513a is prevented from being oriented toward the top of the camera body 1. Therefore, even when foreign matter, such as sliding dust or oil, enters the mechanical shutter 5 from a movable portion, such as a mirror or a gear, after the mechanical shutter 5 has been assembled to the camera body 1, it is possible to prevent the foreign matter from adhering to the attracting surface 513a of the armature 513 to the yoke 533.

This makes it possible to prevent foreign matter from adhering to the attracting surface 513a of the armature 513 to the yoke 533 without providing an additional member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-283240, filed Dec. 20, 2010, which is hereby incorporated by reference herein in its entirety.

What is claimed is:

1. A shutter device that is mounted to a camera body, the shutter device comprising:
   a base plate that has an opening formed therethrough;
   a shutter blade configured to move between a position for closing the opening and a position for opening the opening;
   a drive lever configured to pivot with respect to the base plate to thereby drive the shutter blade in a direction of closing the opening, the drive lever having an armature;
   a drive spring configured to urge the drive lever; and
   a yoke configured to magnetically attract and hold the armature,
   wherein the shutter device releases the armature from a state attracted and held by the yoke to allow the drive lever to pivot by an urging force of the drive spring, the shutter blade being driven in the direction of closing the opening,
   wherein when the shutter device is in a state assembled to the camera body, an attracting surface of the armature to the yoke extends in a direction perpendicular to a bottom surface of the camera body and is disposed closer to the bottom of the camera body than a pivotal axis about which the drive lever pivots is, and
   wherein when the armature is released from the state attracted and held by the yoke, the drive lever is caused to pivot by the urging force of the drive spring toward a top of the camera body from a bottom side of the camera body.

2. The shutter device according to claim 1, wherein the shutter device has an attracting surface exposed opening formed therein for exposing the attracting surface of the armature to the yoke.

3. A camera comprising:
   a camera body member having a lens mounting portion configured to detachably mount a lens; and
   a shutter device comprising:
      a base plate that has an opening formed therethrough;
      a shutter blade configured to move between a position for closing the opening and a position for opening the opening;
      a drive lever configured to pivot with respect to the base plate to thereby drive the shutter blade in a direction of closing the opening, the drive lever having an armature;
      a drive spring configured to urge the drive lever; and
      a yoke configured to magnetically attract and hold the armature,
      wherein the shutter device releases the armature from a state attracted and held by the yoke to allow the drive lever to pivot by an urging force of the drive spring, the shutter blade being driven in the direction of closing the opening,
      wherein when the shutter device is in a state assembled to the camera body, an attracting surface of the armature to the yoke extends in a direction perpendicular to a bottom surface of the camera body and is disposed closer to the bottom of the camera body than a pivotal axis about which the drive lever pivots is,
      wherein when the armature is released from the state attracted and held by the yoke, the drive lever is caused to pivot by the urging force of the drive spring toward a top of the camera body from a bottom side of the camera body, and
      wherein the shutter device has an attracting surface exposed opening formed therein for exposing the attracting surface of the armature to the yoke, wherein the camera body member has a cover plate portion formed thereon, and wherein the cover plate portion covers the attracting surface exposed opening by mounting of the shutter device to the camera body member.

4. The camera according to claim 3, wherein the camera body member is a mirror box for pivotably supporting a mirror.

5. A shutter device that is mounted to a camera body, the shutter device comprising:
a base plate that has an opening formed therethrough;
a shutter blade configured to move between a position for closing the opening and a position for opening the opening;
a blade lever configured to pivot with respect to the base plate to thereby move the shutter blade between the position for closing the opening and the position for opening the opening;
a return spring configured to urge the blade lever;
a drive lever configured to pivot with respect to the base plate to thereby drive the shutter blade in a direction in which the shutter blade closes the opening, the drive lever having an armature;
a drive spring configured to urge the drive lever; and
a yoke configured to magnetically attract and hold the armature,
wherein the shutter device releases the armature from a state attracted and held by the yoke to allow the drive lever and the blade lever to pivot by an urging force of the drive spring, the shutter blade being driven in the direction of closing the opening,
wherein when the shutter device is in a state assembled to the camera body, an attracting surface of the armature to the yoke extends in a direction perpendicular to a bottom surface of the camera body and is disposed closer to the bottom of the camera body than a pivotal axis about which the drive lever pivots is, and
wherein when the armature is released from the state attracted and held by the yoke, the drive lever is caused to pivot by the urging force of the drive spring toward a top of the camera body from a bottom side of the camera body.

6. The shutter device according to claim 5, wherein the shutter device has an attracting surface exposed opening formed therein for exposing the attracting surface of the armature to the yoke.

7. A camera comprising:
a camera body member having a lens mounting portion configured to detachably mount a lens; and
a shutter device comprising:
a base plate that has an opening formed therethrough;
a shutter blade configured to move between a position for closing the opening and a position for opening the opening;
a blade lever configured to pivot with respect to the base plate to thereby move the shutter blade between the position for closing the opening and the position for opening the opening;
a return spring configured to urge the blade lever;
a drive lever configured to pivot with respect to the base plate to thereby drive the shutter blade in a direction in which the shutter blade closes the opening, the drive lever having an armature;
a drive spring configured to urge the drive lever; and
a yoke configured to magnetically attract and hold the armature,
wherein the shutter device releases the armature from a state attracted and held by the yoke to allow the drive lever and the blade lever to pivot by an urging force of the drive spring, the shutter blade being driven in the direction of closing the opening,
wherein when the shutter device is in a state assembled to the camera body, an attracting surface of the armature to the yoke extends in a direction perpendicular to a bottom surface of the camera body and is disposed closer to the bottom of the camera body than a pivotal axis about which the drive lever pivots is,
wherein when the armature is released from the state attracted and held by the yoke, the drive lever is caused to pivot by the urging force of the drive spring toward a top of the camera body from a bottom side of the camera body, and
wherein the shutter device has an attracting surface exposed opening formed therein for exposing the attracting surface of the armature to the yoke,
wherein the camera body member has a cover plate portion formed thereon, and
wherein the cover plate portion covers the attracting surface exposed opening by mounting of the shutter device to the camera body member.

8. The camera according to claim 7, wherein the camera body member is a mirror box for pivotably supporting a mirror.

* * * * *